Sept. 27, 1966    E. J. KOSINSKY    3,275,731
MATERIAL BLENDING
Filed Jan. 25, 1963

INVENTOR.
E. J. KOSINSKY
BY *Young & Quigg*
ATTORNEYS

United States Patent Office 3,275,731
Patented Sept. 27, 1966

3,275,731
MATERIAL BLENDING
Edward J. Kosinsky, Bartlesville, Okla., assignor to Phillips Petroleum Company, a corporation of Delaware
Filed Jan. 25, 1963, Ser. No. 253,925
5 Claims. (Cl. 264—176)

This invention relates to the addition of a first material to a second material in controllable amounts to obtain a uniform blend.

In various industrial processes there is a need to blend two or more materials. One example of this need occurs in the plastics industry wherein various amounts of materials such as dyes, pigments, plasticizers, lubricants, stabilizers, fillers and the like are added to polymers. It is generally important to obtain a uniform blend of the polymer and the additives. This can be difficult, particularly when the additives normally exist as solids. Furthermore, it is often important that the temperatures of the additives and the polymer not exceed preselected values in order ao prevent deterioration of properties.

In accordance with the present invention, a novel procedure is provided for adding controlled amounts of a first material to a second material. This is accomplished by directing the second material through a conduit means which has a spider disposed therein. The spider contains an internal passage which extends from a region outside the conduit to a central region within the conduit on the upstream side of the spider. The first material is directed through this passage into the conduit where it mixes with ahe second material on the upstream side of the spider. The spider divides the flow of the second material into a plurality of streams, and intimate mixing between the two materials occurs in these streams. This system is particularly useful for adding antioxidants to visbroken polymers. The polymer to be visbroken can be directed through a shearing zone wherein the temperature of the polymer is elevated by mechanical shearing action and/or the application of heat. The resulting visbroken polymer can then be passed through a cooling tube to lower the temperature. The antioxidant is added through a spider located at the downstream end of the cooling tube before the polymer is passed through a die.

Accordingly, it is an object of this invention to provide a method of adding a first material to a second material in such a manner as to obtain a uniform blend.

Another object is to provide apparatus for blending materials.

A further object is to provide a system for visbreaking polymers and adding antioxidants to the resulting visbroken polymer.

Other objects, advantages and features of the invention should become apparent from the following detailed discussion, taken in conjunction with the accompanying drawing in which.

Figure 1:
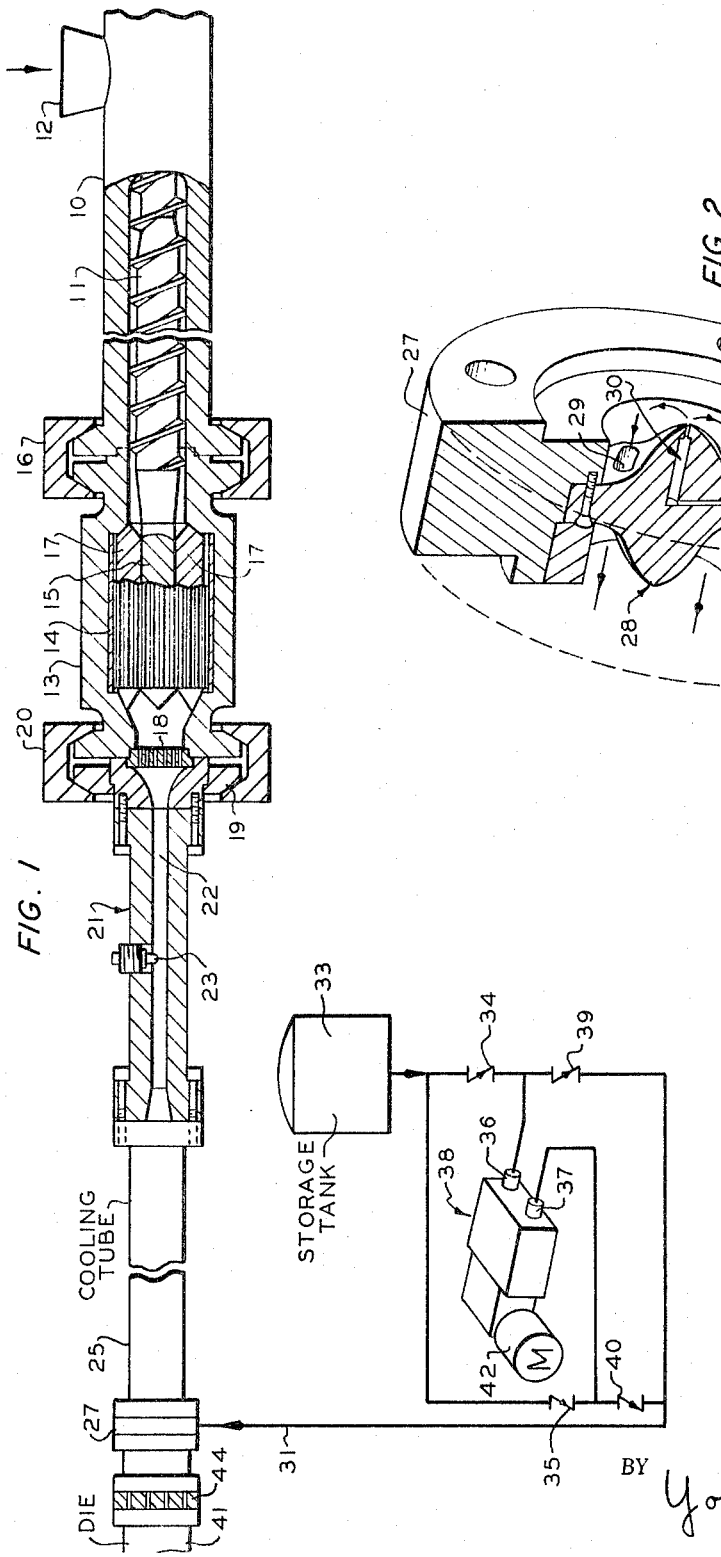
FIGURE 1 is a view, shown partially in section, of polymer visbreaking apparatus having the mixing apparatus of this invention incorporated therein.

Referring now to the drawing in detail and to FIGURE 1 in particular, there is shown a cylindrical housing 10 of a conventional extrusion machine having a feed screw 11 mounted coaxially therein. Polymer is introduced into housing 10 through an opening 12. Feed screw 11 is rotated by a suitable motor, not shown, to advance the polymer through housing 10 to the left. A second housing 13 is connected to the downstream end of housing 10 by means of a clamp 16. This second housing contains an internal gear 14 which is mounted in fixed relationship to the housing. A drive pinion 15 is connected to feed screw 11 to be rotated therewith. A plurality of floating pinions 17 mesh with drive pinion 15 and internal gear 14. These floating pinions rotate free from each other.

A stationary plate and screen pack 18 is positioned across the outlet end of housing 13 and is held in place by means of a flanged plate 19 which is secured to housing 13 by a clamp 20. A control valve assembly 21 is secured to the downstream end of the apparatus thus far described. This control valve has a passageway 22 which is adapted to be restricted by a plug member 23 that is threaded into the passage. A cooling tube 25 is secured to the downstream end of valve 21.

The polymer which is introduced into housing 10 through opening 12 is directed by feed screw 11 into housing 13. In housing 13, the polymer is subjected to visbreaking conditions by the shearing action of the pinions. The resulting visbroken polymer then passes through control valve assembly 21, the residence time of the polymer in the milling head being adjusted by the setting of plug 23. The polymer is cooled in passing through tube 25, but is still in a molten condition at the downstream end of cooling tube 25.

Figure 2:
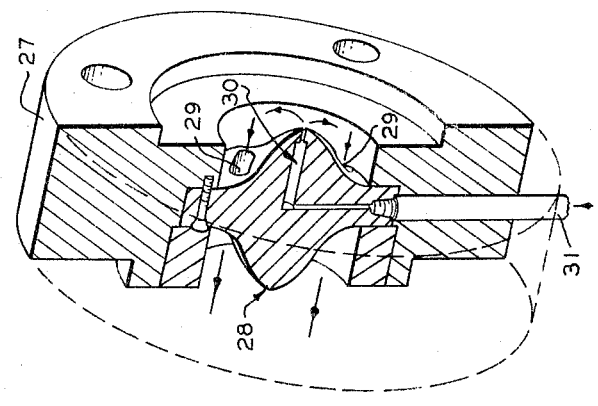
FIGURE 2 is a sectional view of the spider employed in the mixing apparatus of FIGURE 1.

The mixing apparatus of this invention is connected to the downstream end of cooling tube 25. This mixing apparatus comprises a flange assembly 27 which is illustrated in detail in FIGURE 2. A spider 28 is centrally positioned within flange 27, thereby providing a plurality of openings 29 through which the polymer is directed. A passage 30 is drilled in spider 28. One end of passage 30 terminates along the axis of the spider on the upstream side thereof. The second end of passage 30 communicates with a conduit 31 which extends outside flange 27. In some applications, it may be desirable or necessary to insert a second screen pack 44 or other mixing device downstream from spide 28 to assure more complete mixing of the added material with the polymer.

Referring again to FIGURE 1, the material to be added to the polymer is contained in a storage tank 33. This material is added as a liquid. If necessary, the temperature of storage tank 33 and the transfer conduits leading into tube 25 is elevated by a sufficient amount to keep the material liquid. As a specific example, an anti-oxidant such as 2,6-di-tert-butyl-4-methylphenol is added to visbroken polyethylene in amount of about 0.02 to 0.1 weight percent. The outlet of storage tank 33 is connected by respective check valves 34 and 35 to respective first and second ports 36 and 37 of a double acting plunger pump assembly 38. Ports 36 and 37 are also connected through respective check valves 39 and 40 to conduit 31. Storage tank 33 can be positioned so that liquid is permitted to flow by gravity through check valves 34 and 35, or pressure on liquid in the tank can be employed to provide a uniform flow. Nitrogen can be employed to advantage to supply such pressure. Pump assembly 38 contains two pistons which are driven by a motor 42 to permit liquid to flow into respective piston chambers alternately and then be expelled through the outlet check valves. This directs the liquid through conduit 31 into spider 28 at a uniform rate. The liquid flows out through passage 30 and is intimately mixed with the polymer as the polymer flows through passages 29. The central distribution point results in uniform mixing of the additive with the polymer. A conventional die 41 is connected downstream of screen pack 44 to form the resulting blend into any desired shape.

While the invention has been described in conjunction with adding an antioxidant to a visbroken polymer, it should be evident that it is not limited thereto. Various dyes, pigments, plasticizers, lubricants, stabilizers, fillers and the like can be added to selected materials by this procedure, provided that such materials will flow freely through the spider passage and any equipment downstream therefrom.

What is claimed is:

1. The method of adding a first material to a thermoplastic material, which method comprises passing the thermoplastic material in a molten condition through an elongated confined zone in a first direction axially of said confined zone, and introducing the first material into said confined zone at a point on the axis thereof, said first material being introduced in a direction axially of said confined zone and opposite said first direction so that said first material is mixed with said thermoplastic material and thereafter flows with said second material through said confined zone past said point.

2. The method of claim 1 wherein the resulting mixture of the first and thermoplastic materials is thereafter passed from said confined zone through a mixing zone formed by a plurality of parallel flow paths.

3. The method of adding a first material to a thermoplastic material, which method comprises passing the thermoplastic material in a molten condition through an elongated confined zone in a first direction axially of said confined zone, thereafter passing said thermoplastic material through a plurality of zones which communicate at their upstream ends with said confined zone and which join a common flow zone at their downstream ends, said plurality of zones being located about the axis of said confined zone, and introducing the first material into said confined zone at a point on the axis thereof adjacent the upstream ends of said plurality of zones, said first material being introduced in a direction axially of said confined zone and opposite said first direction so that said first material is mixed with said thermoplastic material and thereafter flows with said thermoplastic material through said plurality of zones.

4. The method of treating a thermoplastic material, which method comprises subjecting the material to high shearing action in a shear zone, passing the material thus sheared in a molten condition to an extrusion zone, passing the material from said extrusion zone through an elongated confined cooling zone in a first direction axially of said cooling zone, and introducing an additive for the thermoplastic material into said cooling zone at a point on the axis thereof, said additive being introduced in a direction axially of said cooling zone and opposite the direction of movement of the molten thermoplastic material through said cooling zone, whereby said additive is mixed with the molten thermoplastic material and thereafter flows with said thermoplastic material through said cooling zone past said point.

5. The method of claim 4 wherein said additive is an antioxidant for said thermoplastic material.

References Cited by the Examiner
UNITED STATES PATENTS

| | | | |
|---|---|---|---|
| 574,577 | 1/1897 | Royle | 18—14 |
| 1,523,184 | 1/1925 | Eger | 18—2 |
| 1,541,528 | 6/1925 | Royle | 18—14 |
| 2,298,846 | 10/1942 | Skooglund | 18—48 |
| 2,415,091 | 2/1947 | Frei | 18—2 |
| 2,480,615 | 8/1949 | Strain et al. | 18—48 |
| 3,160,688 | 12/1964 | Aykanian et al. | 18—12 |
| 3,193,877 | 7/1965 | Edwards | 18—12 |

ALEXANDER H. BRODMERKEL, *Primary Examiner.*

MORRIS LIEBMAN, *Examiner.*

M. H. ROSEN, F. S. WHISENHUNT,
*Assistant Examiners.*